United States Patent Office 3,130,143
Patented Apr. 21, 1964

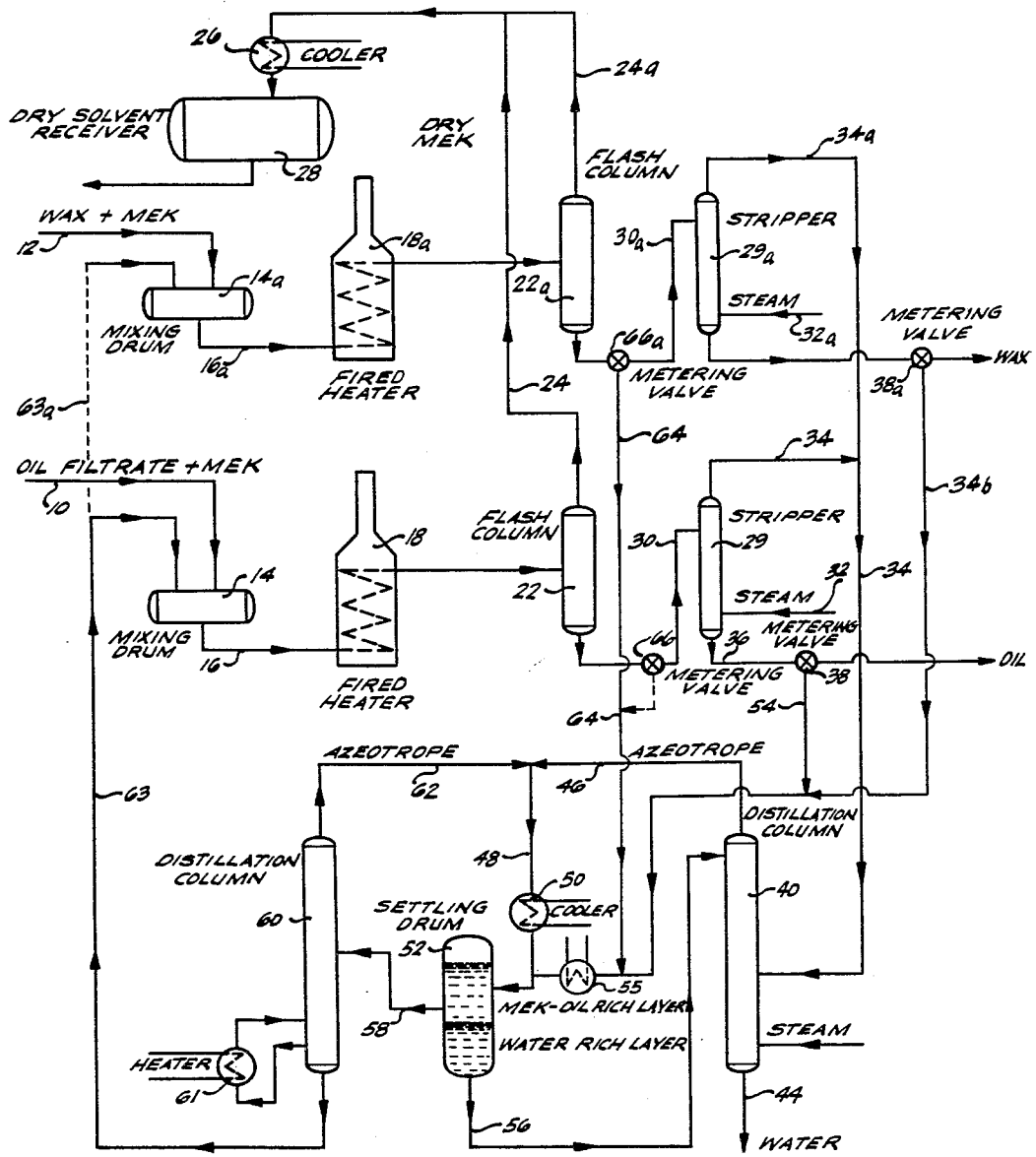

3,130,143
DEWAXING SOLVENT RECOVERY METHOD
Royes Salmon, Oxford, Miss., and Edward A. Pullen, Fullerton, Calif., assignors to Union Oil Company of California, Los Angeles, Calif., a corporation of California
Filed May 29, 1961, Ser. No. 113,409
10 Claims. (Cl. 208—33)

This invention relates to solvent extraction processes employing solvents which form azeotropes with water. Such processes include, for example, wax-oil separation processes using methyl ethyl ketone.

Conventional prior art methods of separating wax and oil from mixtures thereof involve the addition of a diluent or solvent such as liquid propane, methyl ethyl ketone, or the like, or a solvent mixture such as, e.g., acetone and benzene, to the wax-oil charge stock with the addition of heat to effect solution. The heating step is followed by a chilling operation to effect wax precipitation. The resulting slurry is then filtered to obtain an oily wax cake and an oil filtrate. This method of treatment is not always successful since some oil-wax mixtures do not easily filter when the wax is precipitated according to the described technique. With such mixtures the filtration of the wax from the slurry, as well as the deoiling of the oily wax with solvent wash is a difficult operation because the wax crystals are of such nature as to form a compact non-permeable filter bed.

To overcome the aforesaid difficulty of filtering and washing wax cakes a variation of the described method has been proposed whereby the wax-oil feed mixture is chilled to precipitate the wax in the substantial absence of a conventional deoiling solvent. In this alternate method the solvent is added to the chilled mixture just prior to precipitation of the wax therein. The method is described in greater detail in U.S. Patent No. 2,229,658 to Jenkins. Regardless of which method of precipitation and filtration is employed, both products of the filtration (filtrate and wax cake) must be treated further for removal of occluded and dissolved solvent. As part of the solvent removal treatment, the filtrate and wax cake are each subjected to heating and then flash evaporation to remove most of it, in relatively pure form, therefrom. After the flash evaporation treatment there are still traces of solvent in both the filtrate and the wax and these traces are conventionally removed by steam stripping procedures.

The overhead products from the steam stripping of the flashed filtrate and wax are aqueous mixtures of the solvent employed in the wax-oil separation process. Where the solvent is of a type readily separable from water, such as for example a water immiscible solvent or one which can be recovered by distillation from aqueous mixtures thereof, there is no particular difficulty in recovering the solvent from said overhead products in relatively pure form for reuse in the wax-oil separation process. In certain systems, however, water and solvent are not so readily separable, one such system being that in which the solvent forms an azeotrope with water. The present invention is concerned with the recovery of solvent in systems of the latter type, a particular example of which is that resulting from the use of methyl ethyl ketone as the solvent and wax cake wash liquid in a wax-oil separation process. When mixtures of methyl ethyl ketone and water are distilled, the overhead product is an azeotrope from which further separation of solvent by distillation is impossible. Azeotropic mixtures of solvents such as methyl ethyl ketone do not possess the necessary solvent characteristics for use in many wax-oil separating processes. Consequently, in the absence of some method of recovering the solvent in relatively pure form from its azeotrope, it is lost to the system thus adding to the cost of the process.

One method for the recovery of solvents such as methyl ethyl ketone from their aqueous mixtures is to pass the mixtures through a salt tower for removal of the water and dehydration of the solvent, after which treatment the dehydrated solvent is ready for reuse in the system. An operation such as this is described in U.S. Patent No. 2,397,868 to Jenkins, in which the patentee employs salt towers for the final drying steps. While the use of salt towers, according to the Jenkins patent, has its advantages, there are also certain disadvantages to this technique. One disadvantage is that the salt is consumed in the form of brine. Another is that the disposal of such brine presents a problem. Still another disadvantage to the use of salt drying systems is the sharp necessity for controlling corrosion therein.

Another proposed solution for the recovery of a solvent such as methyl ethyl ketone from an aqueous mixture thereof obtained in a wax-oil separation process, is to extract the solvent from the mixture with the wax-oil feedstock to the process. While this method is highly successful in many cases, its use is disadvantageous in those systems in which the wax-oil feedstock is difficultly filterable if the wax is precipitated in the presence of the solvent employed, since solvent would thereby be introduced into the charge stock prior to crystallization of the wax. It is, of course, highly preferable in the case of such feedstocks to add the solvent after crystallization of at least part of the wax rather than prior to such crystallization.

Another proposed solution to the problem of solvent recovery from aqueous solutions such as the above-mentioned stripper overhead products is to mix a quantity of dewaxed oil therewith to form two liquid phases, an upper phase containing the oil, most of the solvent from the stripper overhead and a small amount of dissolved water, and a lower phase containing most of the water from the stripper overhead and a small quantity of dissolved solvent. This method of solvent recovery is set forth in detail in U.S. Patent 2,949,419 to Benedict. In accordance with this method of solvent recovery, the upper oily phase is subjected to flash evaporation to remove, as overhead, the solvent and the small amount of water present in the mixture. The overhead product from the flash operation is then subjected to distillation to expel the water in the form of an azeotrope and leave behind, as a bottoms product, dry solvent which is recirculated to the system.

This method is somewhat cumbersome in that it entails the feeding of relatively large quantities of water-solvent mixture to the phase separation step. Furthermore, the subject method possesses an inherent economic disadvantage in its requirement that the fractionation of the oily phase from the phase separation step be carried out in two steps (flash evaporation and distillation)

rather than only one. Thus, two pieces of apparatus must be furnished and maintained in operation, rather than only one as would be the case with a one-step treatment of said oily phase. The bottoms product from the aforesaid flash evaporation operation is oil which, according to the Benedict patent, is recirculated to the phase separation step of the process. It is, of course, well known to those skilled in the art that continuously circulating oil systems, such as that described by Benedict, are subject to contamination buildup, since there is normally no way for accumulating contaminants to escape.

We have now discovered a method of separating and recovering solvents such as methyl ethyl ketone from their aqueous mixtures which is superior to the above-described methods in that it eliminates the necessity of salt towers, it does not necessitate the introduction of solvent into wax-oil feed charges prior to precipitation of the wax therein, and it accomplishes highly efficient recovery of substantially water-free solvent with a minimum of effort and equipment. Our novel method of solvent recovery involves, as one step, a phase separation operation somewhat similar to that described above, but in all other respects our method differs radically from all other known methods of solvent recovery, and it avoids the above-noted disadvantages of the Benedict solvent recovery method with respect to fractionation equipment demands and oil contamination tendency. Furthermore, our novel method is superior to said other methods in a number of features other than those mentioned as will be apparent to those skilled in the art from the detailed description thereof which follows.

In practicing the preferred embodiment of our invention, a water-solvent solution such as that obtained by condensing the overhead products of steam stripping operations on flashed filtrate and wax cake streams from a wax-oil separation process, is subjected to fractionation to yield a water-solvent azeotrope as one product and substantially solvent-free water as another product which can be discarded. The overhead is condensed and then mixed with a portion of either the dewaxed oil or the melted deoiled wax from the wax-oil separating process thus bringing about the formation of two liquid phases. The first phase consists essentially of all of the oil or wax added to the mixture, most of the solvent from the azeotrope and a small amount of dissolved water. The second phase consists of a water-solvent solution.

In accordance with the solvent recovery process of the present invention, the water-rich layer is subjected to fractionation, preferably in the same apparatus in which the aforesaid stripper overhead products are fractionated, to separate its solvent content in the form of an azeotrope. The azeotrope from this operation is circulated for admixture with oil or wax and subsequent phase separation into two separate liquid layers. Our solvent recovery process is preferably a continuous flow process in which there is continuous circulation of all products formed in its various steps. We prefer to pass the aqueous layer from the phase separation step to fractionation concomitant with that of the combined overheads from the wax and oil stripping operations for obvious reasons of simplicity and economy of operation and equipment.

The first liquid phase from the phase separation operation is subjected to fractionation to yield an azeotrope (normally as an overhead) which can be recirculated to the phase separation step and a product which is a mixture of oil or wax in which is dissolved that solvent recovered by means of our method. The latter product is normally a bottoms product. It is preferably recirculated and mixed with either the oil filtrate product or the wax cake product from the wax-oil separating process (depending on whether oil or wax is used for the phase separating medium), as a result of which most of the solvent is subsequently recovered in pure form by means of flash evaporation.

It is not essential that the oil or wax utilized in our solvent recovery method be a product of a wax-oil separating process and any hydrocarbon having the ability to selectively extract a solvent of the class of azeotropic solvents disclosed hereinafter as within the scope of our invention, from an aqueous mixture thereof, may be used for our purpose. It will be apparent to those skilled in the art that the hydrocarbon used in our process must be adequately selective for the solvent involved since otherwise there would be little or no extraction of that liquid from its aqueous azeotrope in the phase separation (actually liquid-liquid extraction) step of our solvent recovery method. It will also be apparent that the hydrocarbon should preferably be substantially insoluble in water so that it can strongly reject the water present in the solvent-water azeotrope while extracting solvent therefrom. The wax and oil products of wax-oil separating processes lend themselves exceptionally well to our purpose since they are highly selective toward the solvent component of the aqueous solvent feed mixtures of this invention, they are substantially insoluble in water, and, in addition, are conveniently available.

Where a hydrocarbon other than a dewaxed oil or a deoiled wax from a wax-oil separating process which supplies an aqueous solvent feed mixture to our solvent recovery method is employed in our phase separation step, it will normally not be desirable to recirculate the bottoms product of the distillation of the first liquid phase to any stage of a wax-oil separating process. In this case, said bottoms product which is a dry mixture of the hydrocarbon and solvent can be subjected to a separate flash evaporation treatment with the overhead being recovered as substantially pure solvent, and the bottoms being recirculated to the phase separation step of our method. Where such an embodiment of our invention is practiced, the hydrocarbon fed to the phase separation step may be either substantially pure wax, substantially pure oil or mixtures of oil and wax such as, for example, feed mixtures to wax-oil separating processes, or any other hydrocarbon material having the required ability to selectively extract the solvent in question from its aqueous solutions.

It is a principal object of this invention to provide an improved method of recovering deoiling solvents capable of forming azeotropes with water from aqueous solutions thereof.

It is another object of the invention to provide a means of recovering azeotropic deoiling solvents of the aforesaid type from aqueous mixtures thereof produced by stripping operations in wax-oil separating processes for reuse in said processes.

It is another object of the invention to provide such a solvent recovery process in which aqueous solvent mixtures are dehydrated without the use of conventional salt towers.

Another object of our invention is to provide a process for recovering deoiling solvents of the aforesaid type from aqueous solutions thereof whereby the solvent is obtained in the form of an oil or wax solution which can be combined with an oil filtrate or wax cake product from the filtration step of a conventional wax-oil separation process employing said solvent, prior to flash evaporation thereof for recovery of the solvent content.

Another object of our invention is to provide a unitary wax-oil separation and recovery process in which wax is precipitated from the wax-oil mixture in the absence of a deoiling solvent and substantially all the solvent is recovered for reuse in the process.

Still another object of our invention is to provide a wax-oil separation process employing methyl ethyl ketone as a solvent in which flashed filtrate and wax cake filtration products are steam stripped, whereby substantially all of the methyl ethyl ketone from the overhead of the steam stripping operations is recovered and recirculated to the wax-oil separation process by improved means of a simple and economical nature.

Still other objects and advantages of our invention will be apparent to those skilled in the art from the following description which, taken with the accompanying drawing, forms a part of the specification.

Our novel solvent recovery method is limited in usefulness to those systems employing deoiling solvents which form azeotropes with water. As those skilled in the art will appreciate, deoiling solvents other than those which form aqueous azeotropes do not present the problem of solvent recovery which our invention solves. Thus where the solvent is not miscible with water to any substantial extent, its recovery can be easily accomplished by means of phase separation, and where it is miscible with water but forms no azeotrope, its recovery can be achieved by means of a simple distillation operation.

Methyl ethyl ketone is typical of the class of solvents to which our invention is applicable. However, this invention is not limited in application to the recovery of methyl ethyl ketone and it is equally effective for the recovery of other solvents, such as certain alcohols, esters, etc. (see below), which are suitable deoiling solvents and which form aqueous azeotropes.

As will be apparent to those skilled in the art, the reference herein to solvents within the scope of our invention as azeotropic deoiling solvents carries no connotation that the invention is limited to use on product streams from wax deoiling processes to the exclusion of such streams from oil dewaxing processes. The term "deoiling solvent" is intended to include any solvent useful in any wax-oil separation process, regardless of which component predominates in the feed charge, and the invention is of sufficient scope to cover the treatment of any aqueous solution of such solvent so long as it is capable of forming an aqueous azeotrope. The method of the invention is applicable to the treatment of mixtures of the above description from any source as, for example, product streams from solvent extraction processes such as those utilized in the separation of aromatic from nonaromatic hydrocarbons, or the like.

Methyl ethyl ketone is widely used as a solvent for petroleum fractions and in particular as a solvent in wax-oil separation processes. Other solvents or washing agents can under some conditions be used, but most of the other solvents possess disadvantages and are not widely used. For example, acetone dissolves only relatively small proportions of wax, and similarly it dissolves only correspondingly small portions of oil, hence if acetone were used in wax deoiling operations, excessively large quantities of acetone would be required to wash the oil from the wax. However, a large quantity of acetone dissolves relatively large amounts of wax, resulting in loss of wax yields. In oil production, wax carried into the oil in this manner results in a high pour point oil. Ketones of higher molecular weight than methyl ethyl ketone are not as easily removed by flashing from the wax or from the oil as methyl ethyl ketone, hence their use is sometimes undesirable. Water is in general only slightly soluble in the higher molecular weight ketones and accordingly when they are used, they do not present the water solubility problems that methyl ethyl ketone does. Oil is readily soluble in methyl ethyl ketone at wax filtration and washing temperatures, thus requiring only a minimum amount of solvent for washing the oil from the wax.

Methyl ethyl ketone is relatively easily removed from the wax and from the oil filtrate in a low temperature flashing operation. The remainder or final traces of the ketone are removed usually by steam stripping. It is this steam stripping operation which contributes the major portion of water in the methyl ethyl ketone-water solution amenable to treatment by our method. However, water may enter the various flow streams of the wax-oil separation process in other ways as well. For example, it may enter the system with the oil or solvent charge or through leaks in water-cooled condensing and cooling equipment. Furthermore, when a plant is shut down for periodic inspection, repairs, or for other reasons, the entire system is normally drained free from liquids and steam cleaned to completely eliminate all material of either a toxic or inflammable nature. This operation sometimes results in the accumulation of a substantial amount of water in the system.

Examples of solvents which are recoverable from their water solutions by means of this invention are listed below, along with pertinent solubility data, in Table 1. It should be emphasized that this list is not exhaustive but merely exemplary of those deoiling solvents within the scope of our invention.

TABLE 1

| Examples | Solubility, wt. percent (at 20° C.) | | Azeotrope | | |
| --- | --- | --- | --- | --- | --- |
| | Solv. in H$_2$O | H$_2$O in Solv. | B.P., °C. | Wt. Percent Solv. | Wt. Percent H$_2$O |
| Methyl ethyl ketone | 27 | 12.5 | 73.5 | 88.7 | 11.3 |
| Methyl acetate | α | α | 56.5 | 96.5 | 3.5 |
| Diacetone alcohol | α | α | 99.8 | 12.7 | 87.3 |
| Ethanol | α | α | 78.2 | 95.6 | 4.4 |
| Isopropanol | α | α | 80.2 | 87.7 | 12.3 |
| Normal propanol | α | α | 87.7 | 71.7 | 28.3 |
| Sec butanol | 24.4 | 56.0 | 87.5 | 72.7 | 27.3 |

The azeotropic deoiling solvents to which this invention is pertinent are those solvents which are soluble in hydrocarbon oils, preferably to the extent of at least about 10 percent by weight and preferably sufficiently soluble in water at temperatures of 20° C. and higher to assure a one phase water-solvent mixture under the operating conditions of the invention. Also, the solvents should preferably form azeotropes containing not more than about 50 percent water for reasons of practicality. The invention is not limited to the use of such solvents, however, and otherwise suitable solvents forming azeotropes containing as much as 90 percent, and even higher quantities, of water can be employed if desired.

Our invention will be better understood by reference to the accompanying drawing which is a schematic flow diagram showing an arrangement of parts suitable for use in carrying out the process of our invention.

Referring now to the drawing, there are shown two feed streams 10 and 12 from the filtration step of a conventional wax-oil separation process, representing oil filtrate-solvent and wax-solvent mixtures, respectively. The two streams are separately directed to mixing drums 14 and 14a and from there through lines 16 and 16a, respectively, to fired heaters 18 and 18a, respectively, where each is heated to a sufficiently high temperature to effect recovery of the solvent in a subsequent flash evaporation treatment. Where methyl ethyl ketone is the solvent present in the oil and wax streams the liquid mixtures are heated to a temperature of about 500° F., and subjected to a pressure of from about 100 to about 300 p.s.i. in the fired heaters. The pressures in the fired heaters are achieved by heating the feed liquids under confinement. Hence these pressures represent the vapor pressures of the feed stream materials at the temperatures to which they are heated.

The heated oil and wax streams from fired heaters 18 and 18a are introduced into flash columns 22 and 22a, respectively. Flash columns 22 and 22a are maintained at substantially atmospheric pressure and when the hot pressurized liquids from fired heaters 18 and 18a are released therein, substantially pure solvent flash vaporizes and is drawn off as an overhead product leaving bottoms products enriched in oil and wax, respectively. Substantially pure and dry solvent from flash columns 22 and 22a passes through lines 24 and 24a, and into cooler or condenser 26 in which it is condensed. From cooler 26 the condensed solvent is passed into a dry solvent receiver 28 from whence it is then fed back to the wax-oil separation system.

Considering first the oil bottoms product from flash column 22, this material is introduced into a stripper column 29 through line 30. Steam is introduced into the column from line 32 for the purpose of removing substantially the last traces of the solvent from the oil. The overhead product from stripper 29 is a mixture of solvent and water which leaves the top of the column through line 34. The bottoms product from stripper 29 is substantially solvent-free oil which leaves the column through line 36. The temperature and pressure control within stripper 29 is such that the overhead product comprises a mixture of water and solvent with substantially no oil present. The wax bottoms product from flash column 22a is separately steam stripped in stripper 29a and the overhead solvent-water mixture is drawn off through line 34a. A bottoms product of substantially pure wax is recovered from stripper 29a.

The overhead water-solvent product from wax stripper 29a is combined with the overhead water-solvent product from oil stripper 29, as shown, and conducted through line 34 into a distillation column 40. Distillation column 40 is temperature and pressure controlled in such fashion as to produce an azeotrope overhead product and substantially solvent-free water as a bottoms product. The bottoms product is withdrawn from column 40 through line 44 and it may be discarded or recirculated to the system. Depending on the physical state and properties of the stripper overhead products at their point of entry to distillation column 40, that column can be a rectifying column with a reflux condenser, of any known type, or a more simple distillation column. Thus, if the overhead products enter column 40 as hot vapors at a temperature higher than the boiling point of the solvent-water azeotrope, the most appropriate apparatus to use for the fractionation is a rectifying column with a reflux condenser. If, on the other hand, the feed to distallation column 40 is in liquid form, as a result of condensation in either the pipelines or a strategically placed condenser (not shown on the drawing), the fractionation can, if desired, be carried out in a relatively simple distillation apparatus such as, for example, a steam stripping column.

It should be noted that the proportion of water present in distillation column 40 at any given time is normally far in excess of the water concentration of the azeotrope leaving the column as an overhead product. Even if the reverse were true, however, our process would still operate to recover solvent from an aqueous solvent solution, although in this instance the bottoms from column 40 would be substantially dry solvent rather than water. Our solvent recovery method is particularly applicable to those deoiling solvents which form minimum boiling point azeotropes with water. However, our invention is not limited to use with such minimum boiling point solvents and it can be utilized to recover deoiling solvents, otherwise within the scope of the invention, which form maximum boiling point azeotropes with water, from their aqueous solutions.

While our over-all method of solvent recovery would comprise the same series of operations with such solvents as with those solvents forming minimum boiling point azeotropes with water, distillation products streams such as those from fractionating column 40 would bear an inverse relationship to the corresponding minimum boiling point system streams. Thus, where an aqueous solvent mixture of the maximum boiling point type is subjected to fractional distillation, pure water or pure solvent (depending on the over-all concentration of the mixture within the column) comes off as an overhead product and the azeotrope forms as a bottoms product in the fractionating apparatus.

Returning now to the drawing, the azeotrope overhead from column 40 is carried by lines 46 and 48 through a cooler or condenser 50, wherein it is condensed to a liquid, and from there into a settling drum or vessel 52.

A portion of the solvent-free oil bottoms product from stripper 29 is bled from exit line 36 by means of metering valve 38 into line 54 which conveys it to cooler 55, wherein it is cooled to a temperature preferably below the boiling point of the azeotrope in line 48, after which it is passed into line 48 at a point between cooler 50 and settling drum 52 as shown. The addition of the oil from line 54 to the condensed azeotrope in line 48 causes the resulting mixture to subsequently separate into two liquid phases in settling drum 52. We have discovered that for best results the proportion of oil to azeotrope should be kept within the range from about 1 to about 10 parts by weight of the former to 1 part of the latter.

While it is preferred that bottoms oil from stripper 29 be employed as the phase separating agent, our process is not limited to the use of that particular material for the purpose and it is within the scope of our invention to employ the bottoms oil product from flash column 22 either as the whole oil feed to settling drum 52 or as part of the oil feed stream along with stripper 29 bottoms, the two feed streams being blended at the point of intersection of lines 64 and 54 shown on the drawing. When the oil to settling drum 52 consists either wholly or partly of the bottoms product from flash column 22, flow control is maintained by means of metering valve 66 through which that portion of the stream going to settling drum 52 passes to alternate line 64 from whence it is conveyed as indicated on the drawing, to juncture with line 54. From there the oil is passed through line 54, cooler 55, and line 48, as shown, and into settling drum 52.

As indicated above, wax rather than oil can be introduced into settling drum 52 to bring about the formation of two liquid phases, if desired. Here again, as in the case of the oil, the wax feed to settling drum 52 may be drawn from the stripper bottoms material, the flash column bottoms product, or from both sources simultaneously. Where the wax is bled from the stripper bottoms product, its flow is controlled by metering valve 38a so that a portion thereof passes through line 34b and from thence into line 54, cooler 55 and line 48 into settling drum 52 as shown on the drawing. Where the wax is bled from the bottoms product of flash column 22a, its flow is controlled by means of metering valve 66a through which that portion of the wax routed to settling drum 52 passes into line 64 and then through line 54, cooler 55 and line 48 into settling drum 52, as shown on the drawing.

The principal reason for cooling the oil or wax feed to settling drum 52 prior to blending it with the azeotrope overhead from distillation column 40 is to prevent vaporization of said azeotrope upon contact with the oil or wax. The normal temperature range of oil bottoms such as those from flash column 22 and stripper 29 is from about 300° to about 500° F., and this is equally true of liquid wax bottoms such as those from flash column 22a and stripper 29a. The boiling point of the water-methyl ethyl ketone azeotrope, on the other hand, is 164° F., and the undesirability of mixing a material such as this with a large quantity of a liquid at a temperature of from 300° to 500° F., if it is hoped to maintain the resulting mixture in liquid form, is readily apparent.

It is, of course, within the scope of our invention to employ cooling and piping arrangements other than the particular one shown in the drawing for blending and readying the oil or wax and azeotrope streams for introduction into settling drum 52. All that is required is that the two streams be mixed and in liquid form by the time they are introduced into settling drum 52 and this can be accomplished by any technique suitable for the purpose. For example, it is within the scope of our invention to blend said streams prior to cooling either and then, if necessary, condense the mixture.

It is desirable to have good dispersion and intimacy of contact between the oil or wax and azeotrope input streams at the time of their introduction into settling drum 52 in order that a rapid state of solubility equilibrium might be achieved in that vessel. While we have discovered that blending the condensed streams prior to introducing them into settling drum 52 is entirely adequate as a premixing means for our purpose, it is within the scope of our invention to augment or supplant this mixing technique with mechanical mixing, or the like, either before or after condensation of the azeotrope.

The two phases into which the oil-azeotrope feed to settling drum 52 separates consist of two liquid layers, an upper oil-rich layer in which is dissolved most of the solvent from the azeotrope and a trace amount of dissolved water, and a lower water-rich layer containing a minor amount of dissolved solvent.

In our preferred method of operation, the interior of settling drum 52, as well as its input and output lines, is maintained at approximately atmospheric pressure. At this pressure, the preferred temperature of operation is about 100° F., for reasons of convenience and economy of operation, and also since an optimum extraction of solvent by the oil or wax is normally obtained at that temperature. At atmospheric pressure, the temperature within settling drum 52 should preferably exceed 32° F. in order to avoid any possibility of ice formation from the water present. In any event, the temperature and pressure conditions within settling drum 52 should preferably be adjusted and controlled so as to assure the formation and existence of two (and only two) liquid phases therein during the practice of our invention. Also, these conditions should be so fixed as to avoid any possibility of water freezing or wax hardening (where that material is present) in the system. Moreover, the temperature in settling drum 52 should be maintained at a high enough level to exceed the pour point of the oil, where that material is present, but below the boiling point of the azeotrope, or other lowest boiling material present, at the pressure prevailing therein.

Where the solvent to be recovered by our novel method is methyl ethyl ketone, it is best to maintain the pressure at about one atmosphere and the temperature within the range from about 32° (and preferably from about 75° to about 140° F.) to about 170° F. in settling drum 52. The principal reason for the one atmosphere pressure preference is obviously one of convenience and simplicity of operation. The reason for the preferred temperature lower limit of 32° F. has been given. The reason for the preferred upper temperature limit of about 170° F. is the increased tendency of the solvent to retain water in solution at temperatures higher than that. It is possible to operate at temperatures in excess of 170° F., especially where the pressure is controlled at some value other than atmospheric, but there will be an accompanying loss of efficiency and an increase in operating costs, in most cases, where this is attempted.

The water-rich layer is withdrawn from vessel 52 and passed through line 56 into distillation column 40 wherein its solvent content is recovered in the form of an overhead azeotrope. The azeotrope is recirculated to settling drum 50 through lines 46 and 48 in admixture with the azeotrope from the overhead products of oil stripper 29 and wax tripper 29a.

The oil-rich layer in settling drum 52 is withdrawn through line 58 and passed into a distillation column 60. The heat input to distillation column 60 is supplied by a heater 61. The temperature within distillation column 60 is so controlled as to drive off an aqueous solvent azeotrope as the overhead product, but retain the bulk of the solvent in the bottoms. Thus where methyl ethyl ketone is the solvent in the system, the temperature in the top of column 60 should be approximately 164° F. which is the boiling point of an aqueous methyl ethyl ketone azeotrope. While we prefer to use a conventional distillation column for treatment of the oil phase from settling drum 52, it is within the scope of our invention to employ a steam stripper in place of such a column, if desired. It is also within the scope of the invention to dry the oil-rich layer from settling drum 52 by suitable means other than distillation. Thus, in view of the small amount of water normally present in that material, it can be readily dried in a salt tower, or the like, and therefore such an apparatus can be substituted for distillation column 60 within the scope of our invention, if desired.

Where the aqueous solvent azeotrope is of the maximum boiling point type, modification of distillation column 60 to include an additional draw-off point for the removal of dry solvent, or the addition of a supplemental column, will be necessitated.

The last traces of moisture from the oily feed to distillation column 60 are removed in the overhead azeotrope product. The azeotrope is recirculated through lines 62 and 48 to cooler 50 wherein it is condensed and returned to settling drum 52 as shown on the drawing. The bottoms product from distillation column 60 is a dry wax or oil, depending on whether wax or oil is employed as the phase separating agent, having dissolved therein most of the solvent recovered by the method of our invention. Where the bottoms product is an oil mixture, it is recirculated through line 63 to mixing drum 14 in which it is combined with the filtrate product entering drum 14 from line 10. Where the bottoms product from distillation column 60 is a wax mixture, it is likewise recirculated through line 63, but only as far as its juncture with line 63a from whence it passes through line 63a into mixing drum 14a in which it is mixed with the wax-solvent stream entering through line 12. Regardless of whether the bottoms from distillation column 60 is recycled to mixing drum 14 or 14a it will be seen that it is subsequently subjected to a flash evaporation treatment in either flash column 22 or flash column 22a whereby most of its solvent content is recovered as a substantially dry product. It will be observed that the drawing legends show a schematic flow diagram for a methyl ethyl ketone (MEK) system. However, the same flow arrangement would be operative with any minimum boiling point water-solvent system within the scope of our invention.

Our novel solvent recovery system is virtually a closed system wherein the oil or wax and solvent components are continuously recycled with substantially no incurring losses. Normally, the only waste stream from the system is that shown on the drawing as the solvent-free water bottoms from distillation column 40 and as pointed out above, even this could be recirculated if it were economically desirable to do so.

Following is an example of a plant scale operation of the method of our invention utilizing the arrangement of apparatus shown in the drawing. It is to be clearly understood however that this example is not to be construed as limiting, but merely representative, of our invention.

*Example I*

In the present example, methyl ethyl ketone is employed as the deoiling solvent and steam-stripped oil is employed as the separating agent in the phase separation step of the operation. Since the procedure described in this example is practiced using an arrangement of apparatus similar to that shown on the drawing, said apparatus will be identified herein for simplicity's sake by reference to the numbers on the drawing.

A quantity of 14,000 parts by weight of a wax-oil feed stock containing 50 percent wax is chilled in a chiller to effect precipitation of the wax. A quantity of methyl ethyl ketone is chilled to substantially the same temperature as that imparted to the wax-oil feed stock. A portion of the chilled methyl ethyl ketone is added to the chilled wax-oil feed stock and the mixture is passed through a mixer to a filter system. The remainder of the chilled methyl ethyl ketone is passed into the filter system as wash solvent. The filter system is of a type conventionally used in the art for the purpose and therefore no detailed description thereof is necessary here. Suffice it to say that the filter system includes a filter and washing step in which the wax cake is washed with fresh methyl ethyl ketone.

Additional methyl ethyl ketone is added to the wax cake to improve its handling characeristics, and the resulting mixture is then heated and melted in a heater and passed into mixing drum 14a through line 12. The filtrate stream from the filter system consists of 28,000 parts by weight of which 21,000 parts are methyl ethyl ketone and 7,000 parts are oil. This stream is passed into mixing drum 14 through line 10.

At the same time a recycle stream containing 610 parts of oil and 200 parts of methyl ethyl ketone, from a source as set forth below, is introduced into mixing drum 14 through line 63 wherein it is intimately blended with the feed stream from line 10. The resulting mixture of oil and methyl ethyl ketone is passed from mixing drum 14 into fired heater 18 through line 16, in which the temperature of the stream is heated to approximately 500° F. and its pressure goes up to about 300 p.s.i.g.

From fired heater 18 the oil-methyl ethyl ketone stream is passed to flash column 22, which is maintained at atmospheric pressure, wherein approximately 21,100 parts of methyl ethyl ketone flashes off and is recovered as overhead from the column. The overhead from flash column 22 is recycled to a dry solvent receiver 28. The remaining 100 parts of methyl ethyl ketone, along with the 7,610 (7,000+610) parts of oil, is passed as bottoms from flash column 22 through line 30 and into stripper 29. The temperature of this stream is about 460° F. In stripper 29 approximately 100 parts of superheated steam is blown through the 7,710 parts of oil and methyl ethyl ketone and this results in an overhead product containing approximately 100 parts of methyl ethyl ketone and 100 parts of water.

Paralleling the flow of oil filtrate and methyl ethyl ketone into mixing drum 14, is a stream of molten wax and methyl ethyl ketone entering mixing drum 14a through line 12. This stream is equivalent in flow rate to the oil filtrate-solvent stream and thus for every 28,000 parts of that material there are 28,000 parts of the wax-solvent mixture entering the system, the 28,000 parts consisting of 21,000 parts of methyl ethyl ketone and 7,000 parts of wax. The wax-solvent mixture is passed from mixing drum 14a into fired heater 18a, through line 16a, wherein its temperature is raised to about 400° F. and its pressure to about 250 p.s.i.g.

From fired heater 18a, the wax-methyl ethyl ketone solution is passed into flash column 22a, which is maintained at atmospheric pressure, wherein 20,900 parts of the methyl ethyl ketone is flash-evaporated and recovered as an overhead product which is recycled to dry solvent receiver 28. The remaining 100 parts of methyl ethyl ketone, along with the 7,000 parts of wax, is passed as bottoms from flash column 22a through line 30a and into stripper 29a. The temperature of this bottoms stream is about 350° F.

In stripper 29a approximately 100 parts of superheated steam is blown through the 7,100 parts of wax and methyl ethyl ketone, producing an overhead product containing approximately 100 parts of methyl ethyl ketone and 100 parts of water.

The overheads from strippers 29a and 29 are passed through lines 34a and 34, as shown on the drawing, wherein they condense and pass into distillation column 40. Distillation column 40 is operated in the manner of a steam stripper and under such conditions as to yield an azeotrope overhead product. From the 200 parts of methyl ethyl ketone and 200 parts of water entering distillation column 40 there are obtained 226 parts of azeotrope overhead and 174 parts of substantially solvent-free water as bottoms.

Concurrent with the introduction of the 200 parts of methyl ethyl ketone and 200 parts of water from strippers 29 and 29a, there is introduced into column 40, through line 56, 8 parts of methyl ethyl ketone and 26.4 parts of water from settling drum 52 obtained in a manner set forth hereafter. The total output from distillation column 40 (disregarding steam condensation) consists of an overhead azeotrope product containing 208 parts of methyl ethyl ketone and 26.4 parts of water and a bottoms product of 200 parts of solvent-free water.

The overhead azeotrope product from column 40 is condensed, cooled to a temperature of about 100° F. in cooler 50 and passed into settling drum 52. However, before the condensed azeotrope mixture reaches settling drum 52, 610 parts of cooled bottoms oil from solvent stripper 29 is added through metering valve 38, line 54 and cooler 55 as shown on the drawing. The bottoms oil leaves stripper 29 at a temperature of about 400° F. and is cooled in cooler 55 to a temperature of about 100° F. so that the temperature of the ultimate mixture of condensed azeotrope and oil in settling drum 52 is about 100° F. for maximum extraction of methyl ethyl ketone from said azeotrope. The oil is added to the azeotrope prior to its entry into the settling drum in order to achieve good mixing of the two liquid streams prior to their introduction into said settling drum.

As a result of the addition of the dewaxed oil bottoms product to the azeotrope from distillation column 40, two liquid layers are formed in settling drum 52, one being an oil-rich layer containing most of the methyl ethyl ketone from the azeotrope and a small amount of water dissolved therein and the other being a water layer in which there is dissolved a small amount of methyl ethyl ketone. The water layer is present in an amount equivalent to 34.4 parts by weight of which 26.4 parts consists of water and 8 parts of methyl ethyl ketone, the composition of said water layer thus amounting to 77 percent water and 23 percent methyl ethyl ketone. While the process of this example is described in batch terminology, the process is actually performed as a continuous one with continuous recycling of the various flow streams. Accordingly, the water from settling drum 52 is continuously recycled to distillation column 40, its 34.4 parts representing the 8 parts of methyl ethyl ketone and the 26.4 parts of water referred to above.

The upper layer in settling drum 52 contains approximately 848.2 parts in all, consisting of 234 parts of methyl ethyl ketone and 610 parts of oil along with 4.2 parts of water.

The 848.2 parts of the oil-methyl ethyl ketone phase from settling drum 52 is passed into distillation column 60. The product streams from distillation column 60 comprise an overhead azeotrope mixture of water and methyl ethyl ketone, containing 33.0 parts of methyl ethyl ketone and 4.2 parts of water, and a bottoms product containing 610 parts of oil and 200 parts of methyl ethyl ketone. The composition of the bottoms product from distillation column 60 is roughly 75 percent oil and 25 percent methyl ethyl ketone. The bottoms from column 60 is recycled to oil filtrate mixing drum 14 from whence it passes, in admixture with the oil filtrate from the wax filtration operation, through heater 18 and into flash column 22.

An over-all material balance on our novel solvent recovery method shows that the 200 parts of methyl ethyl ketone recovered in the bottoms product from column 60 is equal to the 200 parts of methyl ethyl ketone originally present in the bottoms from flash columns 22 and 22a.

In the procedure described in Example I, distillation column 40 is operated in the manner of a steam stripping column and consequently the water bottoms product therefrom contains the water removed from the overhead products of strippers 29 and 29a, the water removed from the water-rich phase from settling drum 52 and the water condensed from the steam introduced into the column for heating purposes. The amount of water in the overhead products from strippers 29 and 29a is considerably in excess of that required to form an azeotrope with the solvent present and the steam introduced into distillation column 40 serves merely as a heat medium, not as a stripping agent. Consequently the steam input to distillation column 40 does not disturb the material balance of the water and methyl ethyl ketone entering from strippers 29 to 29a and the only effect of the presence of the steam is to increase the quantity of water discharged as bottoms product by an amount equal to the weight of the condensed steam.

*Example II*

This example is similar to Example I except that melted wax from stripper 29a, rather than bottoms oil from stripper 29, is mixed with the condensed azeotrope overhead from column 40 to extract the methyl ethyl ketone therefrom and bring about the formation of the two liquid phases in settling drum 52.

The procedure described in Example I is followed through the filtration and wax cake melting steps. The melted wax cake is passed into mixing drum 14a through line 12. Concurrently, a recycle stream containing 610 parts of melted wax and 200 parts of methyl ethyl ketone, from a source as set forth below, is introduced into mixing drum 14a through line 63a wherein it is intimately blended with the feed stream from line 12. The resulting mixture of wax and methyl ethyl ketone is passed from mixing drum 14a through line 16a into fired heater 18a in which the temperature of the stream is heated to approximately 400° F. and its pressure is raised about 250 p.s.i.g.

From fired heater 18a the wax-methyl ethyl ketone stream is passed to flash column 22a, which is maintained at atmospheric pressure, wherein approximately 21,000 parts of methyl ethyl ketone flashes off and is recovered as overhead from the column. The overhead from flash column 22a is recycled to a dry solvent receiver 23. The remaining 100 parts of methyl ethyl ketone, along with the 7,610 (7,000+610) parts of wax is passed as bottoms from flash column 22a through line 30a and into stripper 29a. The temperature of the stream is about 350° F. In stripper 29a approximately 100 parts of superheated steam is blown through the 7,710 parts of wax and methyl ethyl ketone and this results in an overhead product containing approximately 100 parts of methyl ethyl ketone and 100 parts of water.

Paralleling the flow of wax and methyl ethyl ketone into mixing drum 14a is a stream of oil filtrate and methyl ethyl ketone entering mixing drum 14 through line 10. This stream is equivalent in flow rate to the wax-methyl ethyl ketone stream and thus for every 28,000 parts of that material there are 28,000 parts of the oil filtrate-methyl ethyl ketone mixture entering the system, the 28,000 parts consisting of 21,000 parts of methyl ethyl ketone and 7,000 parts of oil. The oil-methyl ethyl ketone mixture is passed from mixing drum 14 into fired heater 18, through line 16, wherein its temperature is raised to about 500° F. and its pressure to about 300 p.s.i.g.

From fired heater 18, the oil-methyl ethyl ketone solution is passed into flash column 22, which is maintained at atmospheric pressure, wherein 20,900 parts of the methyl ethyl ketone is flash evaporated and recovered as an overhead product which is recycled to dry solvent receiver 23. The remaining 100 parts of methyl ethyl ketone, along with the 7,000 parts of oil, is passed as bottoms from flash column 22 through line 30 and into stripper 29. The temperature of this bottoms stream is about 460° F. In stripper 29 approximately 100 parts of superheated steam is blown through the 7,100 parts of oil and methyl ethyl ketone, producing an overhead product containing approximately 100 parts of methyl ethyl ketone and 100 parts of water.

The overheads from strippers 29a and 29 are passed through lines 34a and 34, as shown on the drawing, where they condense and flow into distillation column 40. From the 200 parts of methyl ethyl ketone and the 200 parts of water entering fractionating column 40 there is obtained 226 parts of azeotrope overhead and 174 parts of substantially solvent-free water as bottoms.

Concurrent with the introduction of the 200 parts of methyl ethyl ketone and 200 parts of water from strippers 29 and 29a, there is introduced into column 40, through line 56, 8 parts of methyl ethyl ketone and 26.4 parts of water from settling drum 52 obtained in a manner set forth hereinafter. The total output from distillation column 40 (disregarding steam condensation) consists of an overhead azeotrope product containing 208 parts of methyl ethyl ketone and 26.4 parts of water and a bottoms product of 200 parts of solvent-free water.

The overhead azeotrope product from column 40 is condensed, cooled to a temperature of about 135° F. in cooler 50, and passed into settling drum 52. However, before the condensed azeotrope mixture reaches settling drum 52, 610 parts of cooled bottoms wax from solvent stripper 29a is added through metering valve 38a, lines 34b and 54 and cooler 55 as shown on the drawing. The bottoms wax leaves stripper 29a at a temperature of about 300° F. and is cooled in cooler 55 to a temperature of about 135° F. so that the temperature of the ultimate mixture of condensed azeotrope and wax in settling drum 52 is about 135° F. in order to effect maximum extraction of methyl ethyl ketone from said azeotrope. The congealing point of the wax is 127° F. and it is obviously essential to maintain the temperature in settling drum 52 at a higher level than this. The wax is added to the azeotrope prior to its passage into the settling drum in order to achieve good mixing of the two liquid streams prior to their introduction into said settling drum.

As a result of the addition of the wax to the azeotrope from distillation column 40, two liquid layers are formed in settling drum 52, one being a wax rich layer containing most of the methyl ethyl ketone from the azeotrope and having a small amount of water dissolved therein, and the other being a water layer in which there is dissolved a small amount of methyl ethyl ketone. The water layer is present in an amount equivalent to 34.4 parts by weight of which 26.4 parts consists of water and 8 parts of methyl ethyl ketone, the composition of said water layer thus amounting to 77 percent water and 23 percent methyl ethyl ketone. As in the case of Example I, the process of this example is performed as a continuous process with continuous recycling of the various flow streams. Thus, the water from settling drum 52 is continuously recycled to distillation column 40.

The upper layer in settling drum 52 contains approximately 848.2 parts in all, consisting of 234 parts of methyl ethyl ketone, 610 parts of wax, and 4.2 parts of water. The 848.2 parts of the wax-methyl ethyl ketone phase from settling drum 52 are passed into distillation column 60. The product streams from distillation column 60 comprises an overhead azeotrope mixture of water and methyl ethyl ketone, containing 33.0 parts of methyl ethyl ketone and 4.2 parts of water, and a bottoms product containing 610 parts of wax and 200 parts of methyl ethyl ketone. The composition of the bottoms product from column 60 is roughly 75 percent wax and 25 percent methyl ethyl ketone. The bottoms from column 60 is recycled to wax mixing drum 14a via lines 63 and 63a from whence it passes, in admixture with the wax from the filtration operation, through heater 18a and into flash column 22a. Here again, as in the case of Example I, the 200 parts of methyl ethyl ketone recovered in the bottoms product from column 60 is equal in amount to that in the bottoms product from flash columns 22 and 22a which is subsequently stripped therefrom in strippers 29 and 29a, respectively.

*Example III*

The procedure described in Example II is repeated except that melted wax bottoms from flash column 22a, rather than wax bottoms from stripper 29a, is mixed with the condensed azeotrope overhead from column 40 to extract the methyl ethyl ketone therefrom and bring about the formation of the two liquid phases in settling drum 52. The wax bottoms product from flash column 22a is fed through metering valve 66a, lines 64 and 54, and cooler 55 into line 48 and admixed with the condensed azeotrope from cooler 50, as shown on the drawing.

The wax bottoms leaves flash column 22a at a temperature of about 350° F. and, as in the case of the wax from stripper 29a (in Example II), it is cooled in cooler 55 to a temperature of about 135° F. so that the temperature of the ultimate mixture of condensed azeotrope and wax in settling drum 52 is about 135° F. While there is a small amount of methyl ethyl ketone in the wax bottoms from flash column 22a, this amount is so small as to have substantially no effect on the system and it can be disregarded for all practical purposes.

*Example IV*

The procedure described in Example I is repeated except that oil bottoms from flash column 22, rather than bottoms from stripper 29, is mixed with the condensed azeotrope overhead from column 40 to extract the methyl ethyl ketone therefrom and bring about the formation of the two liquid phases in settling drum 52. The oil bottoms product from flash column 22 is fed through metering valve 66, lines 64 and 54, and cooler 55 into line 48 and admixed with the condensed azeotrope from cooler 50, as shown on the drawing.

The bottoms oil leaves flash column 22 at a temperature of about 460° F. and, as in the case of the oil from stripper 29 (in Example I), it is cooled in cooler 55 to a temperature of about 100° F. so that the temperature of the ultimate mixture of condensed azeotrope and oil in settling drum 52 is about 100° F. While there is a small amount of methyl ethyl ketone in the oil bottoms from flash column 22, this amount is so small as to have substantially no effect on the system and it can be disregarded for all practical purposes.

The foregoing explanatory description of our invention is not to be considered as limiting since many variations may be made within the scope of the following claims by those skilled in the art without departing from the spirit of said invention. It will be observed that in the drawing, only single pieces of apparatus have been shown. It is to be understood that duplicate equipment may be provided where necessary which may be operated alternately if desired.

We claim:

1. A continuous process for segregating wax and oil from a wax-oil mixture, comprising:
    (1) chilling said wax-oil mixture and a dewaxing solvent to a wax precipitation temperature;
    (2) filtering precipitated wax from said mixture and washing said wax with said dewaxing solvent to produce a wax product containing said dewaxing solvent and a filtrate comprising a mixture of dewaxed oil and said dewaxing solvent;
    (3) flash vaporizing said dewaxing solvent from said wax product of step (2) to produce a first dewaxing solvent vapor, and a flashed wax bottoms;
    (4) steam stripping the remainder of said dewaxing solvent from said flashed wax bottoms thereby producing a first vaporous water-dewaxing solvent mixture as an overhead and a solvent-free wax as a bottoms product;
    (5) flash vaporizing said dewaxing solvent from the step (2) filtrate, thereby producing a second dewaxing solvent vapor and a flashed oil bottoms containing a minor amount of said dewaxing solvent;
    (6) steam stripping said flashed oil bottoms to produce a solvent-free oil and a second vaporous water-dewaxing solvent mixture;
    (7) condensing said first vaporous water-dewaxing solvent mixture, from step (4), and said second vaporous water-dewaxing solvent mixture, from step (6);
    (9) fractionating the condensed material from step (7) together with a water-rich phase from step (10), hereinafter defined, to produce a first water-dewaxing solvent azeotrope as an overhead product and substantially pure water as a bottoms product;
    (9) condensing said first azeotrope;
    (10) mixing said condensed first azeotrope along with a second azeotrope, hereinafter defined, with a quantity of liquid material selected from the group consisting of said flashed wax bottoms product from step (3), said wax bottoms from step (4), said flashed oil bottoms from step (5) and said solvent-free oil product from step (6), whereby two liquid phases are formed, an upper one consisting essentially of a mixture of said liquid material and said dewaxing solvent, with a small amount of dissolved water, and a lower water-rich one consisting essentially of water with a minor amount of said dewaxing solvent dissolved therein;
    (11) recycling said lower water-rich phase to fractionation step (8) whereby its solvent content is removed as a portion of said first water-dewaxing solvent azeotrope and recirculated to phase separation step (10);
    (12) fractionating the upper liquid phase from step (10) to produce a second water-dewaxing solvent azeotrop as an overhead product and a substantially dry mixture of said liquid material mixed with said condensed first azeotrope in step (10) and said dewaxing solvent, as a bottoms product;
    (13) recycling said second azeotrope overhead product from step (12) to phase separation step (10); and
    (14) recycling said bottoms product from step (12) and introducing it into the appropriate product stream from filtration and washing step (2) prior to flash vaporization thereof.

2. The process of claim 1 wherein said dewaxing solvent is methyl ethyl ketone.

3. The process of claim 1 wherein said liquid material mixed with said first azetrope in step (10) consists of said solvent-free oil from step (6).

4. The process of claim 1 wherein said liquid material mixed with said first azeotrope in step (10) consists of said wax bottoms from step (4).

5. The process of claim 1 wherein the proportion of said added liquid material to said condensed azeotrope in step (10) is within the range from about 1 to about 10 parts by weight of the former to every 1 part by weight of the latter.

6. In a process for segregating wax and oil from a wax-oil mixture which comprises chilling said wax-oil mixture to crystallize at least a portion of said wax therein and chilling a quantity of a dewaxing solvent, subjecting the slurry resulting from mixing said wax-oil mixture and said dewaxing solvent to a filtration and cake washing treatment to produce a wax-dewaxing solvent product and a filtrate product comprising a mixture of dewaxed oil and said dewaxing solvent, flashing a substantial portion of dewaxing solvent from said wax-dewaxing solvent product and from said filtrate product to yield a wax bottoms product and an oil bottoms product, respectively, and steam stripping said wax bottoms product and said oil bottoms product to remove the remaining dewaxing solvent therefrom, whereby an overhead of wet dewaxing solvent is obtained in each instance, the improvement comprising:
    (1) fractionating said wet dewaxing solvent overhead products from said steam stripping operations together with a water-rich phase from step (3), hereinafter defined, to produce a first water-dewaxing solvent azeotrope as an overhead product and substantially pure water as a first bottoms product;

(2) condensing said first azeotrope;
(3) mixing said condensed first azeotrope and a second water-dewaxing solvent azeotrope from step (5), hereinafter defined, with a quantity of a liquid product from said process for segregating wax and oil, whereby two liquid phases are formed, a lighter phase consisting essentially of a mixture of said liquid product and said dewaxing solvent, with a small amount of dissolved water, and a heavier water-rich phase consisting essentially of water with a minor amount of said dewaxing solvent dissolved therein;
(4) recycling said heavier water-rich phase to fractionation step (1) whereby its solvent content is removed as a portion of said first water-dewaxing solvent azeotrope and recirculated to phase separation step (3);
(5) fractionating said lighter liquid phase formed in step (3) to produce a second water-dewaxing solvent azeotrope as an overhead product and a substantially dry mixture of said liquid product from said wax-oil segregating process introduced in step (3) and said dewaxing solvent, as a second bottoms product;
(6) recycling said second water-dewaxing solvent azeotrope from fractionation step (5) to phase separation step (3); and
(7) subjecting said second bottoms product from step (5) to flash vaporization to recover substantially all of said dewaxing solvent therefrom in relatively pure form.

7. The improvement as set forth in claim 6 in which said dewaxing solvent is methyl ethyl ketone.

8. The improvement as set forth in claim 6 in which said liquid product from the wax-oil segregating process which is mixed with said first azeotrope in step (3) is dewaxed oil.

9. The improvement as set forth in claim 6 in which said liquid product from the wax-oil segregating process is added to said condensed first azeotrope, in step (3), in a proportion within the range from about 1 to about 10 parts by weight of the former to every 1 part by weight of the latter.

10. The improvement as set forth in claim 6 in which said liquid product from the wax-oil segregating process, which is mixed with said first azeotrope in step (3), is deoiled wax.

References Cited in the file of this patent

UNITED STATES PATENTS

| | | |
|---|---|---|
| 2,229,658 | Jenkins | Jan. 28, 1941 |
| 2,244,407 | Smisloff | June 3, 1941 |
| 2,397,868 | Jenkins | Apr. 2, 1946 |
| 2,582,214 | Twigg | Jan. 8, 1952 |